United States Patent [19]

Takematsu

[11] 4,356,533
[45] Oct. 26, 1982

[54] ELECTRIC FLASH DEVICE

[75] Inventor: Yoshiyuki Takematsu, Tokyo, Japan

[73] Assignee: Fuji Koeki Corporation, Tokyo, Japan

[21] Appl. No.: 133,120

[22] Filed: Mar. 24, 1980

Related U.S. Application Data

[62] Division of Ser. No. 939,704, Sep. 5, 1978, Pat. No. 4,223,372.

[30] Foreign Application Priority Data

Sep. 2, 1977 [JP] Japan .............................. 52-118271[U]
Dec. 9, 1977 [JP] Japan .............................. 52-165292[U]

[51] Int. Cl.³ .............................................. G03B 15/02
[52] U.S. Cl. ........................................ 362/17; 362/16; 362/223; 362/307; 362/375
[58] Field of Search ................... 362/16, 17, 223, 307, 362/375

[56] References Cited

U.S. PATENT DOCUMENTS 4,156,889  5/1979  Halberstadt .......................... 362/16

Primary Examiner—Stephen J. Lechert, Jr.
Attorney, Agent, or Firm—Fleit & Jacobson

[57] ABSTRACT

An electric flash device comprises a housing, a flash unit mounted in the housing and having a reflector which comprises a frame, a reflecting mirror carried by the frame, and a flash tube inserted into the reflecting mirror and having at least one pair of main current electrodes and a trigger electrode for triggering the flash tube and electrically connected to the reflecting mirror, the frame of the reflector being formed integrally with the housing.

9 Claims, 16 Drawing Figures

PRIOR ART

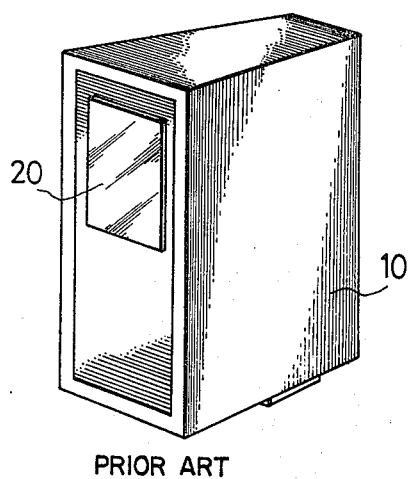
Fig. 1
PRIOR ART
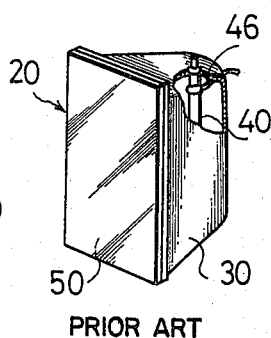
Fig. 2
PRIOR ART
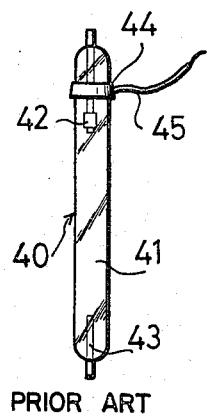
Fig. 3
PRIOR ART
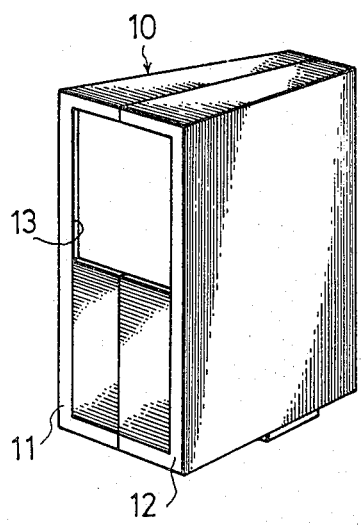
Fig. 4
Fig. 5

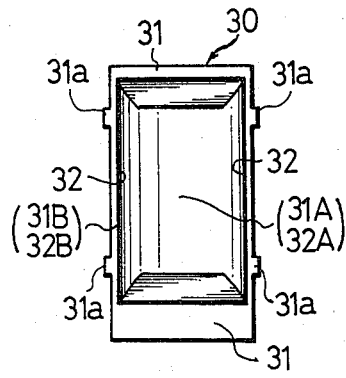
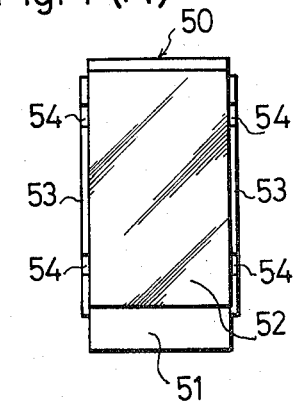
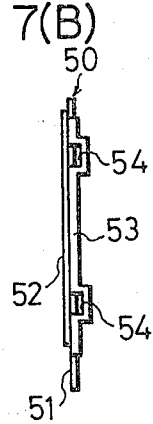
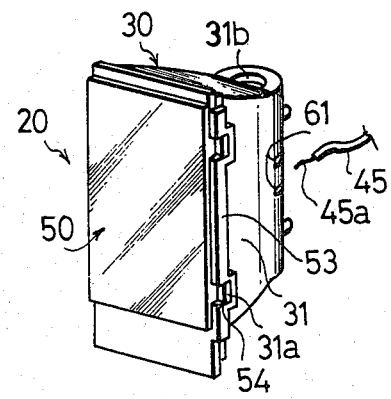
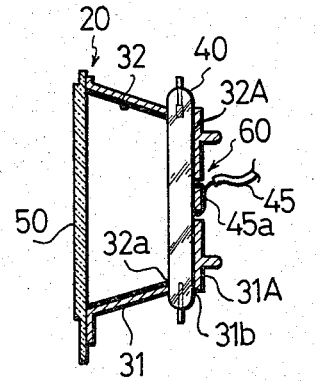
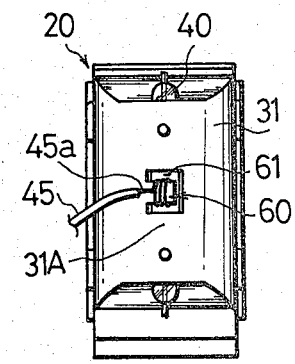

ELECTRIC FLASH DEVICE

This is a divisional of application Ser. No. 939,704 filed Sept. 5, 1978 issued July 16, 1980 Pat. No. 4,223,372.

BACKGROUND OF THE INVENTION

1. Field of the Invention

The present invention relates to an electric flash device and, more particularly, to an improvement of the mechanical construction of a flashing member in the electric flash device.

2. Description of Prior Art

In recent years, the flash apparatus has been widely employed in various kinds of optical apparatus which requires light of the flash. Particularly, in the art of photography, artificial light is used to illuminate an object to be photographed. One form of artificial light which has been in wide use is so-called electric flash device. In such devices, a flash tube is provided in order to illuminate the object to be photographed. The light from the flash tube can be used to illuminate the object to take a picture. Accordingly, the flash device is, mainly, used to take a picture at the night and to remove the unnecessary shadow of the object to be photographed under the natural light in the daytime.

The electric flash device comprises, mainly, a flashing member for generating and directing the flash light toward an object to be illuminated, a power source member for supplying the flashing energy to the flashing member, a charging member for storing the electric energy from the power source member and a flash control circuit member.

The flashing member is the most important part of the electric flash device, because it serves to focus and diffuse the flash light toward the luminous marks. The flashing member comprises a flash tube for generating the flash light, a reflector for focusing the flash light of the flash tube and a flash window for diffusing the flash light. The reflector is located behind the flash tube and the flash window is provided at the front of the reflector in order to diffuse and pass the flash light flux. The flash window is called a protecting plate, as it serves to protect the flash tube from the outer side of the reflector.

With the requirement for inserting the flash device into a camera the need for electric flash devices has rapidly increased. However it is always very difficult to make the electric flash device small without decreasing the output light thereof. Accordingly, efforts have been directed to reduce the size the electric flash device used in the camera.

To obtain an electric flash device conforming to these conditions a necessarily complicated manufacturing process is required; and costs are commensurately unfavourable.

A conventional and prior art electric flash device is shown in FIGS. 1 to 3. A flashing member 20 is arranged on a front surface of a housing 10. Referring particularly to FIG. 2, the flashing member 20 comprises a reflector 30 for reflecting the flash light, a flash tube 40 for generating the flash light and positioned in the inner side of the reflector 30 and a flash window for diffusing the flash light from the flash tube 40. The flash tube 40 is constructed, mainly, by a cylindrical glass tube 41, a positive electrode 42 which is inserted in air-tight relationship into one end portion of the glass tube 41, a negative electrode 43 inserted in air-tight relationship and is opposed to the positive electrode 42, and a trigger electrode 44 which is provided on a circumferential surface of the glass tube 41.

In thus conventional electric flash device, a lead 45 is wound and fastened on the surface of the glass tube 41 in the vicinity of positive electrode 42 and, furthermore, a translucent conductive film is coated on the whole surface of the glass tube 41 so as to form the trigger electrode 44.

Furthermore, it is necessary to coat a silver paint after winding the lead 45 on the conductive film in order to make good electrical contact between the conductive film and the lead 45. It is, therefore, very troublesome to manufacture an electric flash device, because the coating of the film as well as the silver paint are required.

SUMMARY OF THE INVENTION

More specifically an object of the present invention is to provide an economical and high performance electric flash device which allows for reduction in the number of steps to manufacture a flash tube, and by which one is able to simplify the construction of a trigger electrode by means of forming the trigger electrode member in a reflector.

According to the present invention therefore there is provided an electric flash device composed of a housing including at least one casing in which a flash control circuit is mounted and a flashing member mounted on the housing, said flashing member comprises a reflector, a flash tube arranged in the reflector and a trigger electrode member for triggering the flash tube and formed in the reflector.

BRIEF DESCRIPTION OF DRAWINGS

Other objects, features and attendant advantages of this invention will be appreciated more readily as the same becomes better understood by reference to the following detailed description, when considered in connection with the accompanying drawings, wherein like parts in each of the several Figures are identified by the same reference character, and wherein:

FIGS. 1 to 3 already referred to above, are illustrations of a conventional and prior art electric flash device, wherein FIG. 1 is a perspective view of an electric flash device;

FIG. 2 is a perspective view of a flashing member of an electric flash device;

FIG. 3 is a schematic elevational view of a trigger electrode of a flashing member;

FIG. 4 is a perspective view of an electric flash device in accordance with the present;

FIG. 5 is a partially sectioned side view of an electric flash device of FIG. 4;

FIG. 6 is a front view of an embodiment of a reflector according to the present invention;

FIG. 7A is a front view of a protecting plate using in the embodiment of the present invention;

FIG. 7B is a side view of a protecting plate of FIG. 7A;

FIG. 8 is a perspective view of a reflector embodying the present invention;

FIG. 9 is a cross sectioned side view of the reflector of FIG. 8;

FIG. 10 is a back elevational view shown in FIGS. 8 and 9;

DETAILED DESCRIPTION

Figure 11:
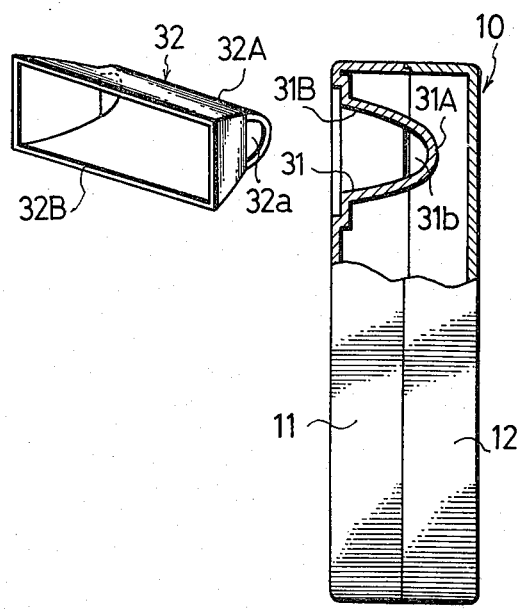
FIG. 11 is a partially sectioned front elevation of a housing and perspective view of a reflector showing a further embodiment of the present invention.

Referring again to FIG. 4 of the drawings, there is shown a greatly simplified electric flash device in accordance with the first embodiment of the present invention. The electric flash device has a flash housing, generally designated by numeral 10 which consists of a first casing 11 and a second casing 12. The first casing 11 is approximately constructed symetrically with respect to the second casing 12, and further the housing 10 is constructed by means of connecting the first casing 11 and the second casing 12. An opening 13 is provided on a front surface of the housing 10, in order to mounting a flashing member as is explained more detail hereinafter.

As is shown in FIG. 5, in side of the housing 10 is provided a reflector chamber 14, a power source chamber 15, a main storage chamber 16 and a control circuit arrangement chamber 17. Further, a reflector mounting member 18 is arranged at an internal side of the opening 13 of the housing 10. The reflector mounting member 18 has projections 18a and 18b, each of which is provided at the front inner wall of each casing 11 and 12. The mounting member 18 is formed by a front wall of the housing 10 and the projections 18a and 18b. A fastening member 19 is constructed by apatures 19a which are provided on the inner surface of the first casing 11 and projections 19b provided on the inner surface of the second casing 12, and thereby the first casing 11 and the second is fastened to each.

FIG. 6 shows a reflector 30 of the flashing member 20, and the reflector 30 consists of a flame 30 and a reflecting mirror 32 which is made of aluminum and is constructed similar shape to the frame 31. The cross section of the flame 31 is formed with U-shape and an open end portion is formed with rectangular shape. Both end surfaces of the frame 31 are tapered from a bottom portion 31A toward the open end portion 31B.

Engaging segments 31a are provided at the peripheral edge of the open end portion 31B of the frame 31. The reflecting mirror 32 is fitted into the inner wall of the flame 31 and thereby the reflector 30 is constructed as is shown in FIG. 6.

As is best shown in FIGS. 7A and 7B, a flash window in the form of a protecting plate 50 consists of a translucent base plate 51 which is made of an acrylic resin, a diffusing plate 52 which is mounted and formed on the surface of the base plate 51 and which serves to diffuse the flash light from the flash tube, and edge portions 53 curved to right angle with respect to the base plate 51. Engaging holes 54 are apatured on the edge portions 53. Formed in one-piece is the base plate 51, the diffusing plate 52 and the edge portions 53. The protecting plate 50 is fastened to the frame 31 of the reflector 30 by means of fitting the engaging segments 31a of the flame 31 into the engaging holes 54 of the protecting plate 50.

As is best shown in FIG. 5, the flashing member 20 is mounted on the housing 10 by fitting and fastening the base plate 51 of the protecting plate 50 between the inner surface of the housing 10 and the fixing member 18.

FIGS. 8 to 10 show a detail construction of the flashing member embodying the present invention. As is shown in FIG. 8, a pair of slots 61 are provided on the center portion of the circular surface of the bottom portion 31A of the flame 31. A core 45a of a lead wire 45 is wound and fixed to the bottom portion 31A through the slots 61.

Apatures 31b for inserting the flash tube into the reflector 30 are opened in both end portions of the bottom 31A of the frame 31. The reflecting mirror 32 is accommodated in the inner wall of the flame 31 in which the lead 45 is fixed to the bottom portion 31A, and apatures 32a is also opened in both end portions thereof in order to insert the flash tube 40, as is best shown in FIG. 9. The flash tube 40 is interposed into the reflecting mirror 32 through the apature 32a.

In accordance with flashing member 20 constructed as is described above, when the flash tube 40 is disposed into the bottom portion 32A of the reflecting mirror 32, the outer circumferential surface of the flash tube 40 compressively contacts with the inner surface of the bottom portion 32A of the reflecting mirror 32 and, thereby the outer circumferential surface of the reflecting mirror 32 is contacted with the core 45a of the lead wire 45 which is fixed to the bottom portion 31A of the frame 31. Accordingly, the lead 45 is electrically connected to the outer circumferential surface of the glass tube 41 of the flash tube 40 by way of the flashing mirror 32. Thus, a trigger electrode member 60 of the flash tube 40 is constructed by means of the lead 45 and a reflecting mirror 32.

According to the trigger electrode member 60 constructed as above, it is unnecessary to coat the conductive film and, thereby, the loss of light quantity is decreased, because the outer circumferential surface of the glass tube 41 of the flash tube 40 is compressively contacted with the inner surface of the mirror 32 by the elastic force of the bottom portion 31A of the frame 31.

In securing the lead wire 45 to the frame 31, it is easy to wind the lead wire 45 to the frame 31, because the bottom portion 31A has the elastic force due to the slots 61.

According to the first embodiment illustrated in FIGS. 4 to 10, it is easy to perform the quantity production of the flashing member 20 and to obtain an economical electric flash device, because the trigger electrode member 60 of the flash tube 40 is constructed the slots 61 provided on the bottom portion 31A of the frame 31, the bottom portion 32A of the reflecting mirror 32A of the reflecting mirror 32 and the other circumferential surface of the glass tube 41.

Additionally, although the slots 61 are opened in the centre portion of the bottom portion 31A in the reflector 30 shown in FIGS. 8, 9 and 10, the invention is not limited to this, and the slots 61 may also be opened at the position in which the reflecting mirror 32 is contacted with compressively to the lead wire 45. And, further, in the invention, a bonding agent may also be employed in order to bond the protecting plate 50 with the frame 31.

Figure 12:
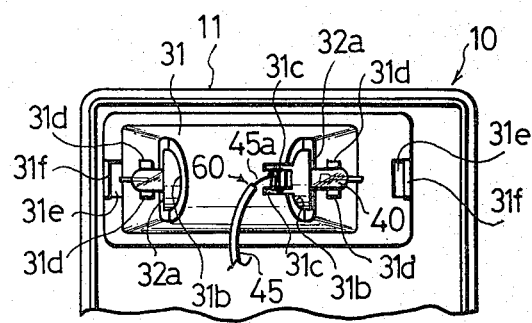
Figure 13:
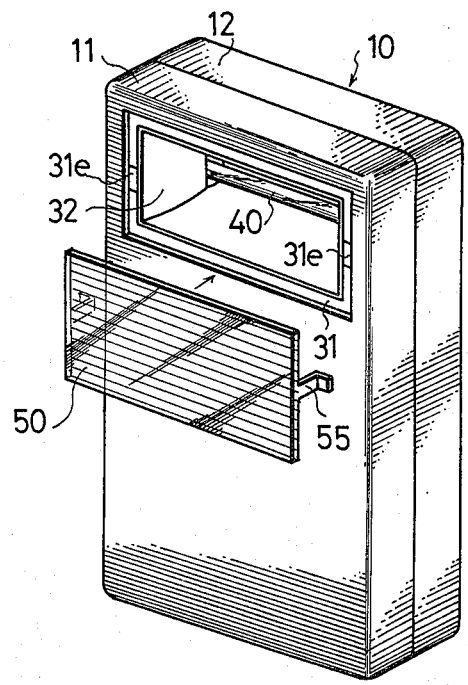
FIG. 13 is a perspective view of an electric flash device of the present invention.

FIGS. 11 to 13 is representative of a further embodiment of an electric flash device according to the present invention. In the electric flash device of FIGS. 11 to 13, a frame 31 of a reflector 30 is faciliated with a housing 10 in a body, and a reflecting mirror 32 is accommodated into the frame 31.

More specifically, the housing 10 consists of a first casing 11 and a second casing 12. The frame 31 is mounted onto the inner surface of the first casing 11 in a body, which has a similar cross section, a bottom portion 31A and an open end portion 31B. On both end surfaces of the bottom portion 31A, apatures 31b are also provided in order to mount a flash tube 40. As is best shown in FIG. 12, a pair of slots 31C are provided along a longitudinal axis of the frame 31 on one extremely end portion of the bottom portion 31A. A pair of stoppers 31d for holding a flash tube 40 are embedded at the both end sides of the frame 31. The frame 31 and a stoppers 31d are made of the same material in the form of a synthetic resin as that of the housing 10, and faciliated by means of molding in one molded body.

As is illustrated in FIG. 11, the reflecting mirror 32 is constructed to similar figure to the frame 31. The reflecting mirror 32 is mounted onto the inside of the frame 31, and also has apatures 31a in the extremely both end portions in order to insert the flash tube 40 thereto.

A lead wire 45 is mounted on the bottom portion 31A of the frame 31 and, thereafter, the flash tube 40 is accommodated into the reflecting mirror 32 through the apatures 32a. In this case, the both end portions of the flash tube 40 is fitted into the slots 31C, and thereby the flash tube 40 is sufficiently fastened by means of the inner surface of the reflecting mirror 32 and the stoppers 32d so as to be compressed to the inner surface of the reflecting mirror 32. Accordingly, a trigger electrode member 60 of the flash tube 40 is constructed and formed by the lead wire 45 which is wound and secured to the bottom portion 31A of the frame 31, the reflecting mirror 32 and the glass tube 41 of the flash tube 40.

After inserting the flash tube 40 into the reflecting mirror 32, a protecting plate 50 is attached to the open end portion 32B of the reflector 30, as is shown in FIG. 13. Engaging segments 55 are mounted on the both ends of the protecting plate 50. The engaging segments 55 are curved to the L-shape. The L-shaped engaging segments engage with an engaging projections 31f which are embedded at the edge of an openings 31e opened at the both ends of the frame 31. Thence the protecting plate 50 is fitted to the open end portion 31B of the reflector 30.

Additionally, an adhesive may also be employed in order to mount and secure the protecting plate 50 to the reflector 30.

It is apparent from the electric flash device of FIGS. 11 and 13 constructed as hereinabove that the following advantages are obtained.

Since the frame 31 of the reflector 30 is constructed in a body with the housing 10, the number of assembling parts and the assembling process are decreased, and therefore the device becomes inexpensive.

Since the flashing member 20 is attached completely to the housing 10, the reliability is enhanced.

Additionally, it is possible to make the reflecting mirror by means of evaporating the aluminum over the inner surface of the frame 31, as a modification of the reflecting mirror 32.

Figure 14:
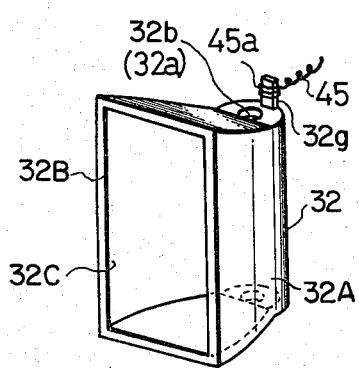
FIG. 14 is a perspective view of a flame of a reflector employing in the present invention.

FIG. 14 shows a modification of a flashing member, which is applicable to the present invention. According to this modification, a reflecting mirror 32 is made of the aluminum, and the inner surface 32c of the reflecting mirror 32 serves as a reflecting portion. A projecting segment 32g are provided and directed towards an axial and longitudinal direction at the one extremely end of the bottom portion 32A. A lead wire 45 is connected and secured to the projecting segment 32g by means of spot welding, and thereby a trigger electrode member 60 is constructed thereto, because the lead wire 45 is electrically connected by way of the reflecting mirror 32 to the circumferential surface of the glass tube of the flash tube, when the flash tube is attached to the reflecting mirror 32.

The reflecting mirror 32 shown in FIG. 14 may also be used in various electric flash devices of each embodiments described hereinabove.

Figures 15A, 15B:
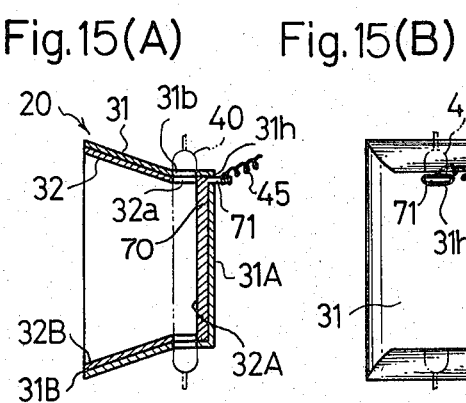
FIG. 15A is a cross sectional side view of a further modification of a reflector using in the present invention.
FIG. 15B is a back elevational view shown in FIG. 15A.

FIGS. 15A and 15B are illustrative a further modification of a flashing member embodying the invention. As is best shown in FIGS. 15A and 15B, a frame 31 is made of a synthetic resin, and a rectangular apature 31h is provided in a bottom portion 31A of the frame 31. An electrically conductive plate 70 is arranged inside of the bottom portion 31A. A conductive projection 71 of the conductive plate 70 is directed toward the outer side of the bottom portion 31A of the frame 31. A lead wire 45 is connected to the conductive projection 71 by means of the spot welding or the solder joint. A mirror 32 is accommodated within the frame 31 so that a bottom portion 32A contacts with the conductive plate 70. When a flash tube 40 is jaxtaposed into the reflecting mirror 32, the circumferential surface of the flash tube 40 is electrically connected to the lead wire 45 through the conductive plate 70 and the reflecting mirror 32.

In the flashing member 20 shown in FIGS. 15A and 15B, the lead wire 45 can be fixed to the conductive plate 70 by winding thereto instead of the spot welding or the solder joint, and the conductive plate 70 may also be mounted on the reflecting mirror 32 in a body.

An advantage of the present invention over the prior art electric flash device is that, as a trigger electrode is formed by connecting a lead wire to a reflector, the new electric flash devices are capable of a high performance and are able to prevent the reduce of the light quantity because it is unnecessary to coat a conductive film over the surface of the flash tube.

Another advantage of the present invention is that, as it is unnecessary to coat a film over the flash tube a flash tube is easy to manufacture and the cost of the flash tube is reduced and therefore the new electric flash device is inexpensive.

I claim:

1. An electric flash device comprising a housing, a flash unit mounted in said housing and having a reflector which comprises a frame, a reflecting mirror carried by said frame, and a flash tube inserted into said reflecting mirror and having at least one pair of main current electrodes and a trigger electrode for triggering said flash tube and electrically connected to said reflecting mirror, said frame of the reflector being formed integrally with said housing.

2. An electric flash device as claimed in claim 1, wherein said reflecting mirror is discontinuous so as to form an opening, and wherein said flash unit includes a flash window provided over said opening of the reflecting mirror.

3. An electric flash device as claimed in claim 1, wherein said trigger electrode comprises a lead wire and fastening means for fastening said lead wire to said reflector so as to electrically connect said lead wire to said reflecting mirror carried by said frame.

4. An electric flash device as claimed in claim 2, wherein the frame comprises an insulation material and the reflecting mirror comprises a metallic material.

5. An electric flash device as claimed in claim 4, wherein said frame has a rear portion, wherein said fastening means includes a pair of slots spaced apart on said rear portion of said frame to form a portion of the frame between said slots, said lead wire being wound on said portion of said frame between said slots.

6. An electric flash device as claimed in claim 5, wherein said slots are semicircular and are centrally disposed with respect to said rear portion of said frame.

7. An electric flash device as claimed in claim 5, wherein said flash tube has an axis, said rear portion having an end portion, and wherein said pair of slots are disposed at said end portion of said rear portion of the frame and extend parallel to said axis of the flash tube.

8. An electric flash device as claimed in claim 3, wherein said fastening means of the trigger electrode includes a conductive plate having a portion in contact with the reflecting mirror and a projection, said frame being discontinuous so as to form an opening in the frame, said lead wire being connected to said projection of the conductive plate.

9. An electric flash device as claimed in claim 3, wherein said frame has an inner surface, and wherein said reflecting mirror is constructed by depositing aluminum on the inner surface of the frame.

* * * * *